US009399515B1

(12) United States Patent
Riley et al.

(10) Patent No.: US 9,399,515 B1
(45) Date of Patent: Jul. 26, 2016

(54) INJURY MITIGATION FOR AERIAL DELIVERY OVER ACTIVE POPULATIONS

(71) Applicants: Justin Riley, Medway, MA (US); Andrew Meloni, Southborough, MA (US)

(72) Inventors: Justin Riley, Medway, MA (US); Andrew Meloni, Southborough, MA (US)

(73) Assignee: The United States of America as represnted by the Secretary of the Army, Washington, DC (US)

( * ) Notice: Subject to any disclaimer, the term of this patent is extended or adjusted under 35 U.S.C. 154(b) by 22 days.

(21) Appl. No.: 14/468,504

(22) Filed: Aug. 26, 2014

Related U.S. Application Data

(60) Provisional application No. 61/869,818, filed on Aug. 26, 2013.

(51) Int. Cl.
*B64C 1/22* (2006.01)
*B64D 1/14* (2006.01)
*B64D 17/00* (2006.01)

(52) U.S. Cl.
CPC . *B64D 1/14* (2013.01); *B64D 17/00* (2013.01)

(58) Field of Classification Search
CPC ................................ B64D 1/12; B64D 17/343
USPC ....................... 244/137.3, 147, 148, 149, 150
See application file for complete search history.

(56) References Cited

U.S. PATENT DOCUMENTS

| | | | | |
|---|---|---|---|---|
| 4,342,437 | A * | 8/1982 | Farinacci | 244/137.3 |
| 5,039,036 | A * | 8/1991 | Rogers | 244/138 R |
| 7,461,817 | B1 * | 12/2008 | Hansson et al. | 244/151 B |
| 7,845,595 | B2 * | 12/2010 | Goddard | 244/137.3 |
| 8,033,507 | B2 * | 10/2011 | Fox, Jr. | 244/151 B |
| 8,480,035 | B2 * | 7/2013 | Goddard et al. | 244/137.3 |

* cited by examiner

*Primary Examiner* — Brian M O'Hara
*Assistant Examiner* — Keith L Dixon
(74) *Attorney, Agent, or Firm* — Roger C. Phillips

(57) ABSTRACT

An aerial delivery system includes at least one container mounted on a platform, an impact attenuator initially interposed between the container and the platform, an activation tether arranged to cause contents of the container to disperse, and rigging material attached to the impact attenuator, the platform and the activation tether and configured to rotate the platform to face upward and the impact attenuator to face downward during aerial delivery.

7 Claims, 9 Drawing Sheets

INJURY MITIGATION FOR AERIAL DELIVERY OVER ACTIVE POPULATIONS

STATEMENT OF GOVERNMENT INTEREST

The invention described herein may be manufactured and used by or for the U.S. Government for governmental purposes without the payment of any royalties thereon or therefor.

FIELD

The disclosed embodiments relate in general to an aerial delivery system, and more particularly to providing aerial delivery while mitigating a risk of injury.

BACKGROUND

Natural disasters often result in a lack of food or clean water for the first 48-72 hours after the disaster occurs as a result of infrastructure damage, for example, power plants, water treatment plants, roads, ports and runways. Airdrops of humanitarian aid supplies such as medical supplies, food and clothing provide needed relief in these situations. In a related area, forestry fire fighters are generally resupplied with food and water by aerial delivery of multiple 50 pound bundles. Various military ground operations may require resupply of ammunition, clothing and rations through aerial delivery, and both military and commercial organizations may seek to provide information to a population through aerial delivery.

Present airdrop capabilities, in particular, humanitarian food and water drops, suffer from drawbacks including a lack of ability to deliver water and a large injury risk posed by delivery mechanisms including containers, skid boards and large food items, for example, Meals Ready to Eat (MREs) or Humanitarian Daily Rations (HDRs). The U.S. and British armies and private industry have used impact attenuators in several forms for aerial delivery. For example, external struts comprised of inner and outer cylinders that force hydraulic fluid through an orifice to dampen impact have been used on spacecraft capsules as well as on aircraft main landing gear. These systems provide great control over the force/time curve, however they are expensive, complicated, and beyond the expertise of the average rigger. Airbags have also been used in several military applications. The British have used a specially designed platform, the Medium Stress Platform (MSP), with recesses to house deflated airbags for cargo airdrop. Upon exit from the aircraft, the airbags inflate and attenuate the load during impact. This system utilizes a fixed venting area, resulting in a peaked force/time curve, where a "rectangular" profile is desired. The rectangular force/time curve can be obtained with airbags using variable venting areas, adding to the cost and complexity of the system. As much of the stroke of the airbag is used to build the pressure, the system is often excessively large, leading to possible hazards on the ground, including re-inflation of the airbag and payload roll over. In addition, the aircraft-platform interface has to be modified to accept these platforms.

Present delivery systems also suffer from clumping, where items have a tendency to clump together and fail to disperse over the drop zone. Furthermore, items that clump together generally fall faster and experience a much harder impact, reducing their survivability and usefulness after landing and creating a danger for those on the ground in the drop zone.

It would be advantageous to utilize an airdrop system that overcomes these and other problems and safely disperses various items directly over a population.

SUMMARY

The disclosed embodiments are directed to an aerial delivery system including at least one container mounted on a platform, an impact attenuator initially interposed between the container and the platform, an activation tether arranged to cause contents of the container to disperse, and rigging material attached to the impact attenuator, the platform and the activation tether and configured to rotate the platform to face upward and the impact attenuator to face downward during aerial delivery.

The disclosed embodiments are also directed an aerial delivery system having a plurality of containers mounted on a platform, an impact attenuator initially interposed between the containers and the platform, a rigging arrangement passing through the impact attenuator and the platform, the rigging arrangement including an activation tether arranged to cause contents of the containers to disperse, and a suspension point attached to an end of the activation tether, the rigging arrangement configured to rotate the platform to face upward and the impact attenuator to face downward during aerial delivery.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the present disclosure, and together with the general description given above and the detailed description given below, serve to explain the principles of the present disclosure. As shown throughout the drawings, like reference numerals designate like or corresponding parts.

FIG. 1 shows a diagram of an initial configuration of an aerial delivery system incorporating aspects of the present disclosure;

FIG. 2 shows an exemplary platform of an aerial delivery system incorporating aspects of the present disclosure;

FIG. 3 shows an exemplary assembly of the platform and an impact attenuator incorporating aspects of the present disclosure;

FIGS. 4 and 5 show an arrangement of rigging material of an aerial delivery system incorporating aspects of the present disclosure;

FIG. 6 shows an activation tether incorporating aspects of the present disclosure;

FIG. 7 shows an arrangement of a platform, an impact attenuator, and rigging material incorporating aspects of the present disclosure;

FIG. 8A shows an arrangement of an enclosure net and containers positioned on an impact attenuator incorporating aspects of the present disclosure;

FIG. 8B shows an arrangement of a lanyard attached to containers and to an attachment point of an activation tether according to the present disclosure;

DETAILED DESCRIPTION

Figure 1:
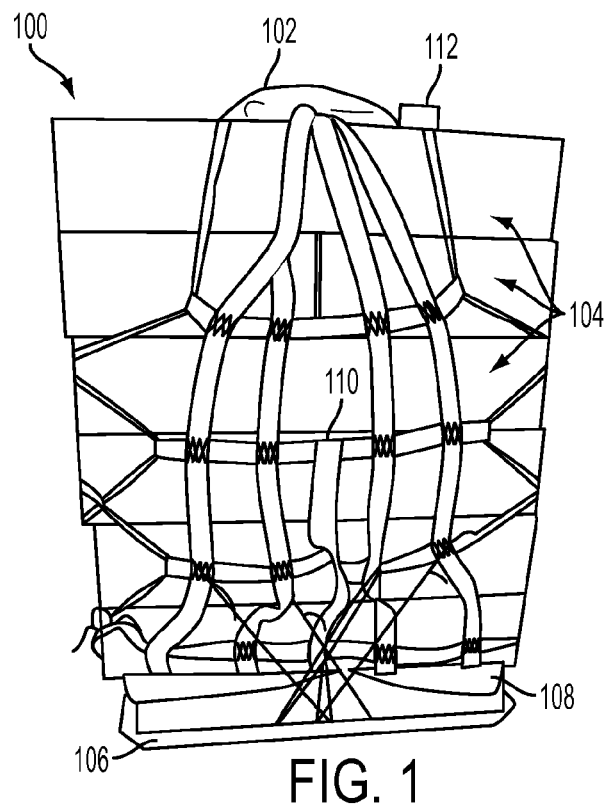
Figure 2:
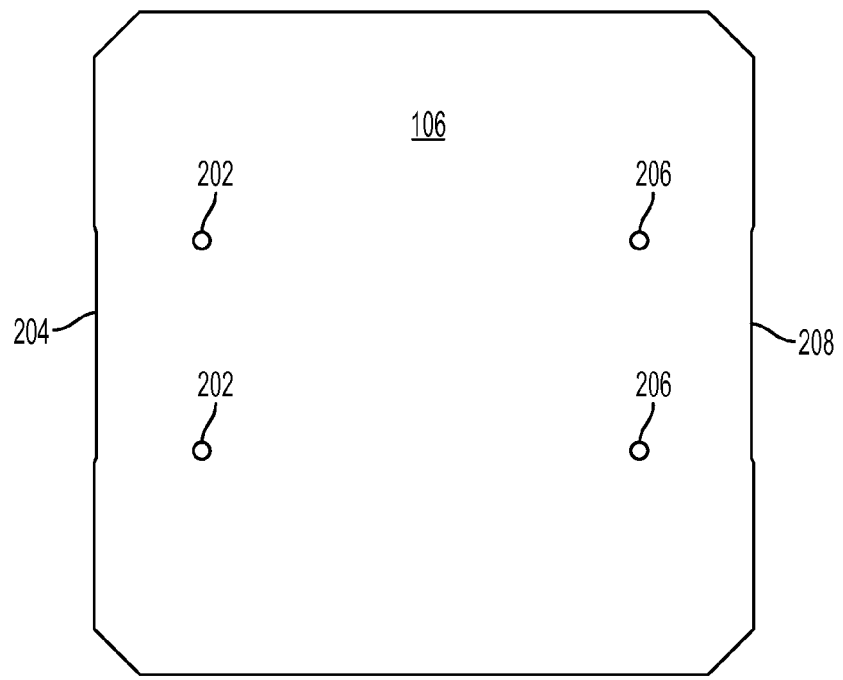
Figure 3:
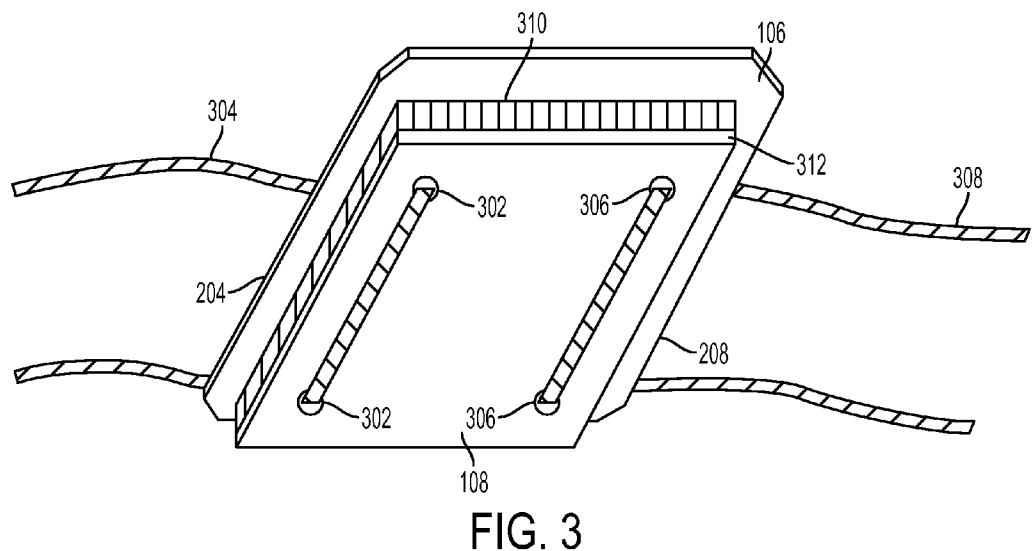
Figure 4:
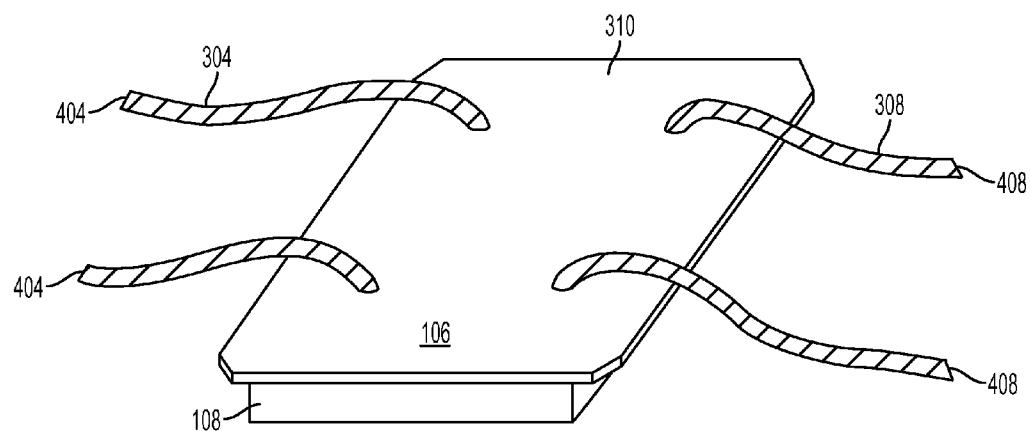
Figure 5:
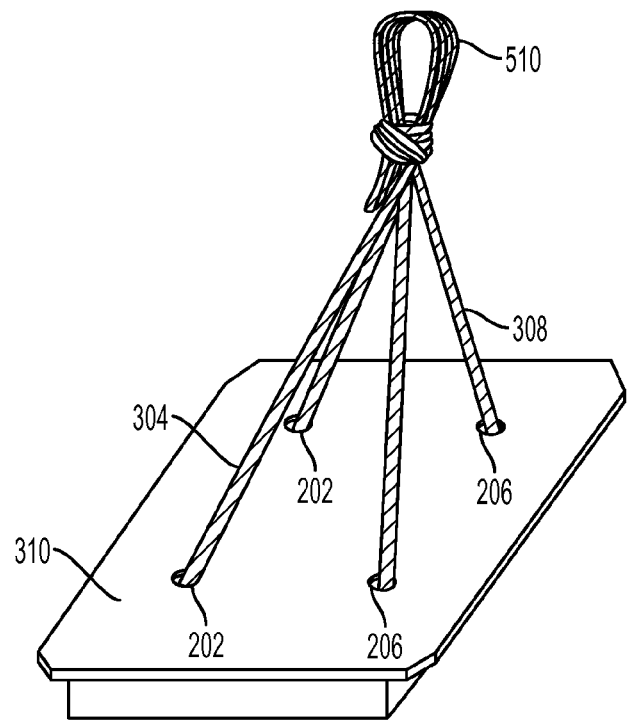
Figure 6:
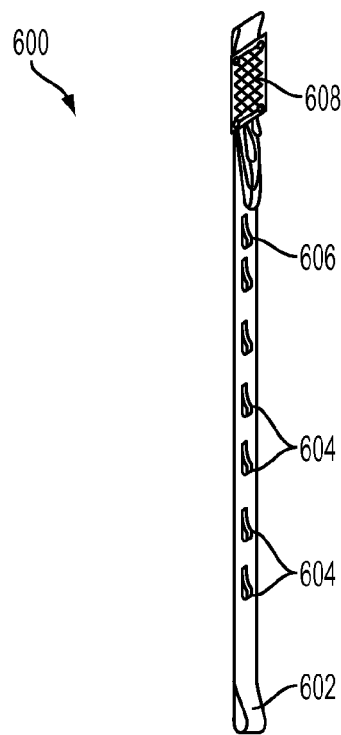
Figure 7:
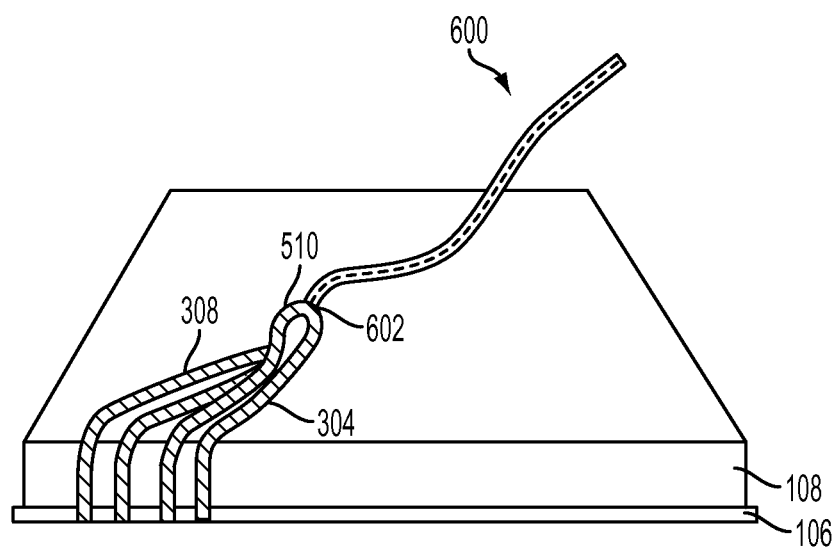
Figure 8A:
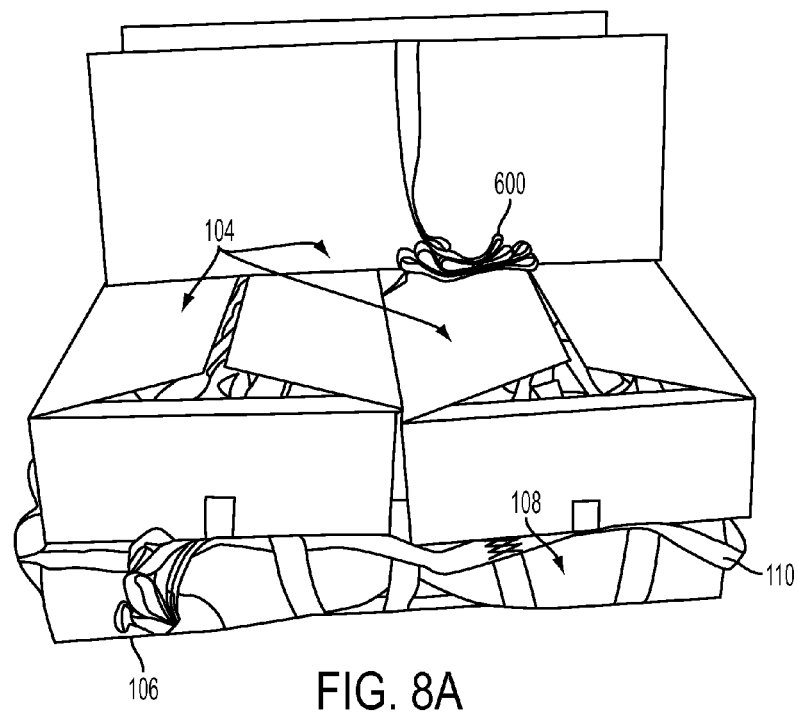
Figure 8B:
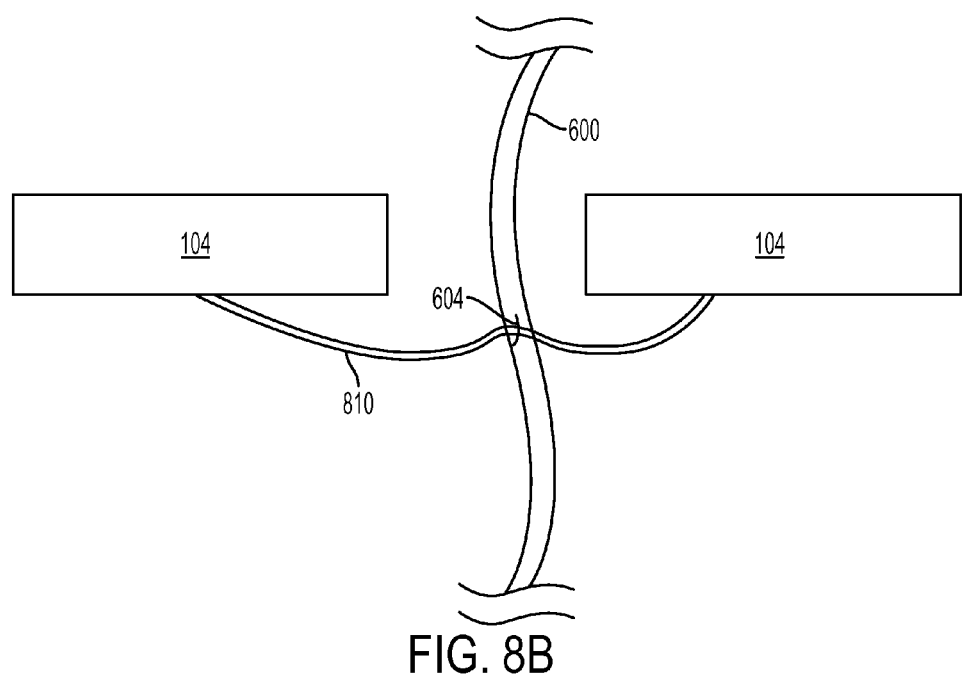
Figure 9:
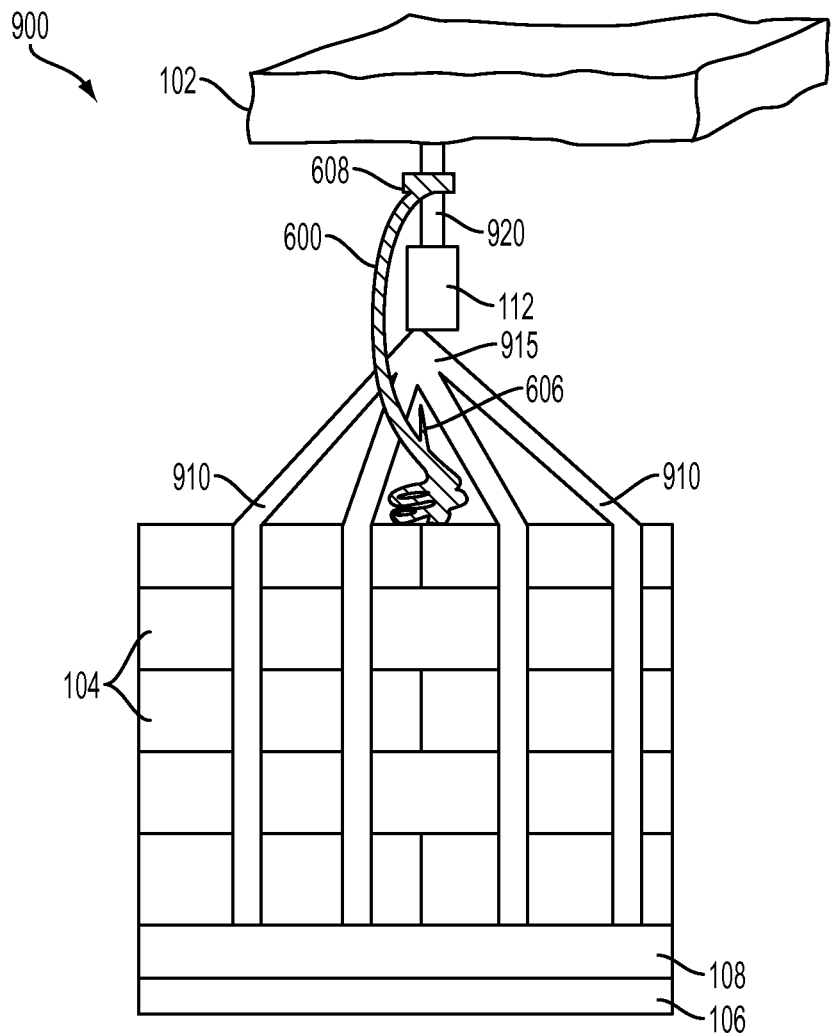
FIG. 9 shows a diagram of an aerial delivery system incorporating aspects of the present disclosure.

Referring to FIG. 1, one embodiment of an aerial delivery system 100 incorporating aspects of the disclosed embodiments is illustrated. The aspects of the disclosed embodiments are generally directed to an aerial delivery system that allows for dispersion of items directly above an active population while mitigating the risk of injury. The disclosed embodiments at least provide for releasing items in tiers for improved dispersion and to avoid clumping, reconfiguration of impact attenuator material after deployment, and retention of all delivery components to avoid injury to the active population.

FIG. 1 shows a schematic diagram of an initial configuration of an aerial delivery system 100 according to the disclosed embodiments. Delivery system 100 includes a parachute 102, one or more containers 104, a platform 106 and an impact attenuator 108. The impact attenuator 108 is initially positioned between the containers 104 and the platform 106. An enclosure net 110, in this example constructed of rigging materials, operates to hold the components of the delivery system together. The delivery system 100 may also include a release mechanism 112 and an activation tether described below. In at least one embodiment, the initial configuration is compatible with various aircraft cargo handling arrangements, for example, powered cargo handling equipment, forklifts, conveyors, rails and rollers in the aircraft cargo bay, where the initial configuration construction, materials, and dimensions are generally compatible with various aircraft cargo systems.

FIG. 2 shows an exemplary platform 106. The platform may be made of a rigid material, for example, plywood, and may be provided with holes, placed in at least one aspect, so as to avoid interference with any cargo handling arrangement or other interface with the platform 106. In at least one embodiment, the platform 106 has four holes, one located in each of four quadrants of the platform 106. Two holes 202 may be placed adjacent one edge 204 of the platform and two holes 206 may be placed adjacent an opposite edge 208 of the platform.

FIG. 3 shows an exemplary assembly of the platform 106 and impact attenuator 108. The platform 106 and impact attenuator 108 may be fastened together, for example, by gluing or any other suitable fastening technique. In at least one embodiment, the impact attenuator 108 may include different materials in a layered structure, for example, an inner honey comb layer 310 and an outer high density foam layer 312. It should be noted that the impact attenuator may be constructed of any material or number of materials suitable for diminishing impact. The impact attenuator 108 may be provided with holes 302, 306 corresponding to the holes 202, 206 in the platform 106. A first piece of rigging material 304 may be laced through the holes 302 in the impact attenuator 108 and the corresponding holes 202 in the platform adjacent edge 204 of the platform 106. A second piece of rigging material 308 may be laced through the holes 306 in the impact attenuator 108 and the corresponding holes 206 in the platform adjacent edge 208 of the platform 106.

As shown in FIG. 4, each piece of rigging material 304, 308 may be laced so that ends 404 of the first piece of rigging material 304, and ends 408 of the second piece of rigging material 308, extend from the impact attenuator 108 and exit through a side of the platform 310 facing away from the impact attenuator 108. As shown in FIG. 5, ends 404 and 408 are secured together to form a rigging suspension point 510.

FIG. 6 shows an activation tether 600 to be connected at one end to the suspension point 510. The activation tether 600 includes a suspension point attachment 602, a plurality of spaced apart tiered attachment points 604, a cut knife 606, and an upper attachment point 608.

As shown in FIG. 7, the platform 106 and impact attenuator 108 are inverted and the rigging material 304, 308 is secured in place, allowing the platform to freely interface with various aircraft cargo handling arrangements, for example, powered cargo handling equipment, forklifts, conveyors, rails and rollers in the aircraft cargo bay, and any other device for transporting the aerial delivery system 100. The rigging material 304, 308 and suspension point 510 may then be draped over the impact attenuator and the suspension point 510 may be attached to the activation tether 600.

As shown in FIG. 8A, enclosure net 110 is placed over the impact attenuator 108 with at least the activation tether 600 extending through and operating to retain the enclosure net 110. In some embodiments, the suspension point 510 may also extend through the enclosure net 110. Additional rigging (shown in FIG. 1) may secure the enclosure net 110 to the impact attenuator 108 or the platform 106. The containers 104 are stacked on the impact attenuator over the enclosure net 110 in alternating tiers with each tier oriented lengthwise perpendicular to the next. The containers 104 may be filled before assembling the aerial delivery system 100 or may be filled as each tier is assembled. In at least one embodiment, lanyards 810 are attached to adjacent containers 104 in each tier and then to one of the tiered attachment points 604 of the activation tether 600, as shown in FIG. 8B. While the lanyards 810 are shown attached to the bottom of the containers 104, it should be understood that the lanyards may be attached to any portion of the containers so long as the contents of the containers are effectively emptied from the containers during deployment.

FIG. 9 shows a schematic diagram of at least one embodiment of the final assembly 900 of the aerial delivery system 100, for example, for use in a High Altitude Low Opening (HALO) deployment. Extensions 910 of the enclosure net 110 are joined together to form an enclosure suspension point 915 which is fastened to release mechanism 112 which is fastened to a parachute suspension point 920 for parachute 102. In some embodiments, release mechanism 112 may be a three ring release mechanism, a four ring release mechanism, or any other mechanism suitable for releasing a connection between the enclosure suspension point 915 and the parachute suspension point 920. The release mechanism 112 operates to allow the enclosure suspension point 915 and the parachute suspension point 920 to separate according to a specified condition, for example, at a specified altitude or after a specified time period. In at least one embodiment, the release mechanism may include a wireless activation device which may be activated by one or more of altitude, timing, or a wireless signal. The upper attachment point 608 of activation tether 600 is also attached to the parachute suspension point 920. In at least one exemplary embodiment, the cut knife 606 of the activation tether 600 is positioned to cut the extensions 910 of the enclosure net 110 upon release by the release mechanism 112 to provide a substantially uniform dispersion of the contents of containers 104. In another exemplary embodiment of the final assembly 900, for example, for use in direct deployment, the release mechanism may be eliminated with only the upper attachment point 608 of activation tether 600 attached to the parachute suspension point 920. The parachute may be, for example, a 15' ring slot parachute, a 26' high velocity parachute, or any parachute having a canopy shape, size, configuration or suspension suitable for the embodiments described herein.

Figure 10:
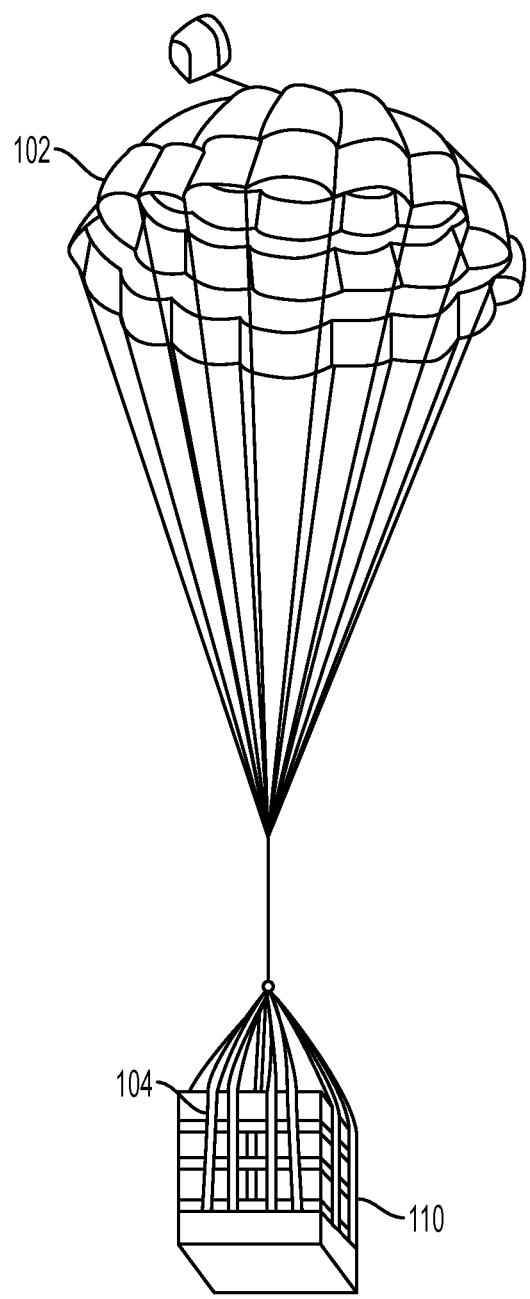
FIG. 10 shows an exemplary deployment of an aerial delivery system incorporating aspects of the present disclosure.
Figure 11:
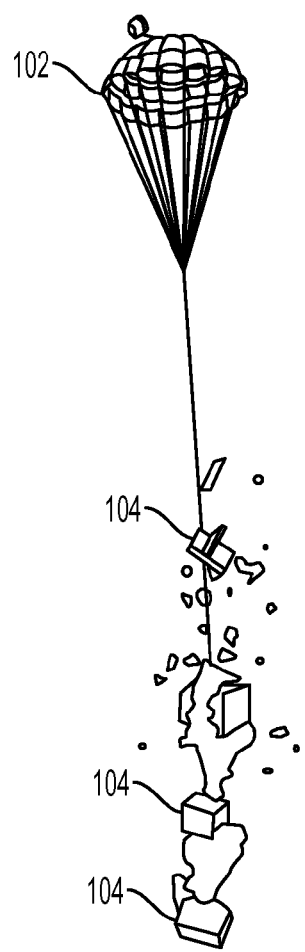
FIG. 11 shows the results of the operation of a release mechanism according to aspects of the present disclosure.
Figure 12:
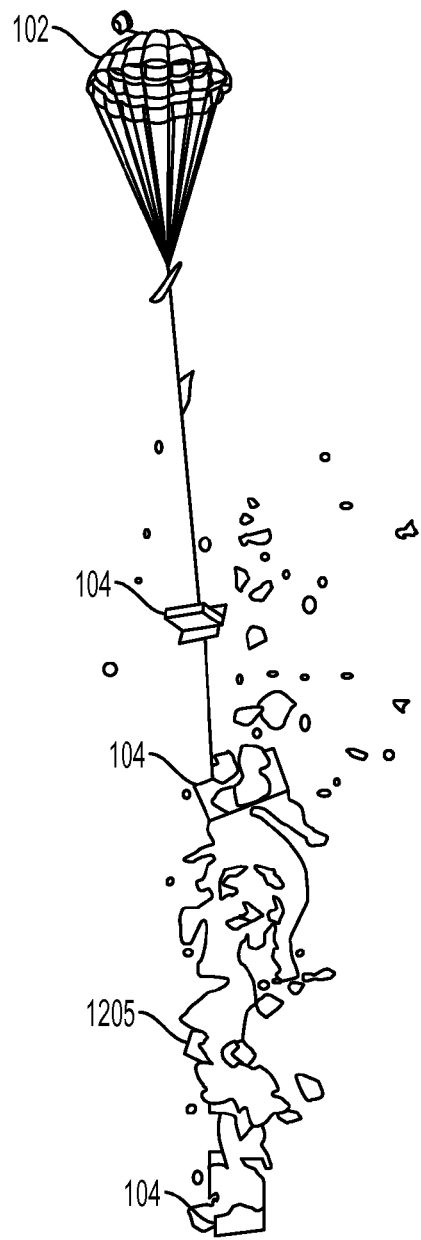
FIG. 12 shows delivery items being dispersed according to aspects of the present disclosure.
Figure 13:
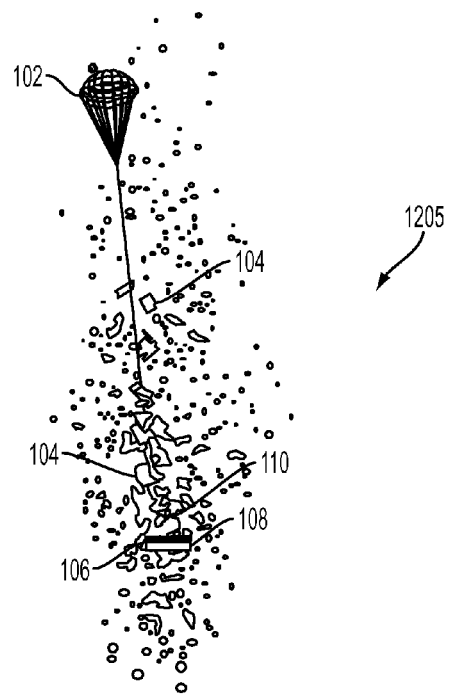
FIG. 13 shows components of the delivery system being retained according to aspects of the present disclosure.
Figure 14:
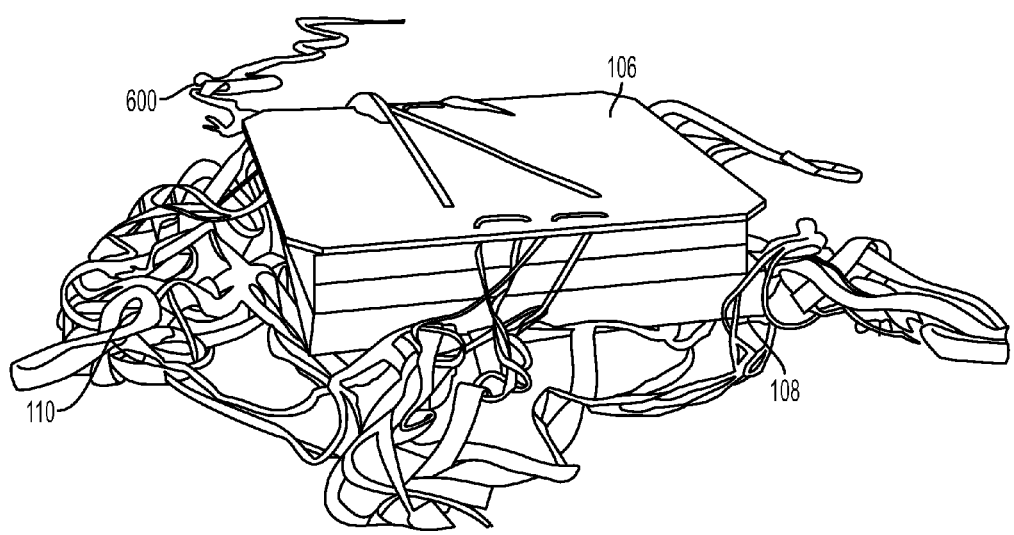
FIG. 14 shows an exemplary result of deployment of the system after touch down according to aspects of the present disclosure.

In a HALO deployment, the parachute 102 inflates upon exit from an aircraft and descends with the enclosure net 110 and containers 104 as shown in FIG. 10. Upon reaching a prescribed altitude or exceeding a prescribed time duration, the release mechanism 112 releases the enclosure net 110 and containers from the parachute 102 as shown in FIG. 11. As the separation distance increases, the still attached activation tether 600 extends and the lanyards 810 attached to each tier of containers 104 cause the containers 104 to change orientation, for example to invert, and their contents 1205 are dispersed tier by tier as shown in FIG. 12. Advantageously, the tiered release reduces clumping of the contents and provides for improved dispersion over the drop area. All the components of the delivery system 100, including the parachute 102, containers 104, enclosure net 110, platform 106 and impact attenuator 108 remain attached to activation tether 600 and lanyards 810 as shown in FIG. 13. As the activation tether 600 extends, the suspension point attachment 602 of the activation tether 600 pulls on the rigging suspension point 510 (FIG. 5), causing the platform 106 and impact attenuator 108 to rotate and change orientation with the platform 106 facing up and the impact attenuator 108 facing downward before touching down. The down facing impact attenuator operates to reduce or eliminate injury to ground personnel from the delivery system during touch down.

In a direct deployment, the enclosure net 110 and containers 104 separate from the parachute 102 upon exiting the aircraft. Similar to the embodiment above, as the separation distance increases, the still attached activation tether 600 extends and the lanyards 810 attached to each tier of containers 104 cause the containers 104 to change orientation and their contents 1205 are dispersed tier by tier. In direct deployment, the containers 104 also remain attached to the lanyards 810 and activation tether 600. Similar to the embodiment above, as the activation tether 600 extends, the suspension point attachment 602 of the activation tether 600 pulls on the rigging suspension point 510 (FIG. 5), causing the platform 106 and impact attenuator 108 to rotate and change orientation with the platform 106 facing up and the impact attenuator 108 facing downward before touching down.

FIG. 14 shows an exemplary result of deployment of the system after touch down, with the platform 106 facing upward, the impact attenuator 108 facing down, the enclosure net 110 and activation tether 600 still attached. The parachute and containers (not shown in this Figure) remain attached to the activation tether and the lanyards.

The disclosed aerial delivery system provides improved content dispersion by releasing the content material in tiers, operates to reconfigure a support platform during flight so that an impact attenuator faces downward to protect ground personnel from a support platform or other components of the aerial delivery system, and retains all delivery system components together to minimize injury risk and to facilitate recovery of delivery system components if desired.

Thus, while there have been shown, described and pointed out, fundamental novel features of the invention as applied to the exemplary embodiments thereof, it will be understood that various omissions and substitutions and changes in the form and details of devices and methods illustrated, and in their operation, may be made by those skilled in the art without departing from the spirit of the invention. Moreover, it is expressly intended that all combinations of those elements and/or method steps, which perform substantially the same function in substantially the same way to achieve the same results, are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An aerial delivery system comprising:
a parachute having an upper attachment point;
a plurality of containers each having contents located therein and being supported by a platform;
an enclosure net covering the containers and the platform, the enclosure net having extensions;
a release mechanism connected between the upper attachment point and the extensions of the enclosure net;
an impact attenuator having a honey comb layer and a layer of high density foam and being initially interposed between the container and the platform;
an activation tether connected, at one end thereof, to the upper attachment point, interconnected with each of the plurality of containers and, at another end thereof, connected to a rigging suspension point, the activation tether being spaced between connections to each of the containers whereby contents of the containers will disperse upon extension of the activation tether, the activation tether comprising a cut knife for cutting the extensions of the enclosure net to release the net from surrounding the containers and the platform upon activation of the release mechanism, in turn, allowing for extension of the activation tether; and
rigging material that extends from the layer of high density foam of the impact attenuator through slots in the honey comb layer and slots in the platform and then terminates at the rigging suspension point whereby upon release of the net and extension of the activation tether the rigging material rotates the platform to face upward and the impact attenuator to face downward.

2. The aerial delivery system of claim 1, comprising a lanyard attached between each of the containers and the activation tether.

3. The aerial delivery system of claim 1, wherein the plurality of containers are mounted in alternating perpendicular tiers.

4. The aerial delivery system of claim 1, wherein the activation tether comprises a plurality of spaced apart attachment points, the aerial delivery system comprising lanyards attached between the containers and the attachment points to separate the containers in tiers from the platform during aerial delivery.

5. The aerial delivery system of claim 4, wherein the lanyards are configured to retain the containers during aerial delivery.

6. The aerial delivery system of claim 1, wherein the release mechanism is configured to release the enclosure net according to a specified condition.

7. The aerial delivery system of claim 6, wherein the specified condition comprises at least one of an altitude or expiration of a time period.

\* \* \* \* \*